United States Patent
Crowe et al.

(10) Patent No.: US 11,680,170 B2
(45) Date of Patent: Jun. 20, 2023

(54) SILICATE-EMULSION PRIMER AND PAINT

(71) Applicant: BEHR PROCESS CORPORATION, Santa Ana, CA (US)

(72) Inventors: Jonathan William Crowe, Santa Ana, CA (US); Gregory Allen Williams, Laguna Beach, CA (US); Jens Hentschel, Orange, CA (US); David Anthony Ruiz, Ontario, CA (US); Promita Datta, West Bengal (IN)

(73) Assignee: Behr Process Corporation, Santa Ana, CA (US)

( * ) Notice: Subject to any disclaimer, the term of this patent is extended or adjusted under 35 U.S.C. 154(b) by 527 days.

(21) Appl. No.: 16/775,662

(22) Filed: Jan. 29, 2020

(65) Prior Publication Data

US 2021/0230431 A1 Jul. 29, 2021

(51) Int. Cl.
| C09D 1/02 | (2006.01) |
|---|---|
| C09D 7/43 | (2018.01) |
| C09D 5/02 | (2006.01) |
| C09D 7/61 | (2018.01) |
| C09D 17/00 | (2006.01) |

(52) U.S. Cl.
CPC .............. *C09D 1/02* (2013.01); *C09D 5/024* (2013.01); *C09D 7/43* (2018.01); *C09D 7/61* (2018.01); *C09D 17/007* (2013.01)

(58) Field of Classification Search
None
See application file for complete search history.

(56) References Cited

U.S. PATENT DOCUMENTS

| 3,403,116 A * | 9/1968 | Meyer ................... C09D 127/08 |
| | | 524/24 |
| 4,325,859 A * | 4/1982 | Blount ................ C08G 18/3895 |
| | | 521/134 |
| 9,051,488 B2 | 6/2015 | Luo et al. |
| 9,410,054 B2 | 8/2016 | Coppens et al. |
| 10,308,815 B2 | 6/2019 | Ranganathan et al. |
| 2007/0066732 A1 * | 3/2007 | Stahovic ................. C09D 5/024 |
| | | 524/376 |
| 2009/0143540 A1 * | 6/2009 | Ghosh .................. C09D 133/12 |
| | | 525/417 |
| 2010/0203274 A1 * | 8/2010 | Illsley ...................... C09D 1/04 |
| | | 428/36.6 |
| 2018/0112077 A1 | 4/2018 | Ranganathan et al. |
| 2019/0382581 A1 * | 12/2019 | Di Giovanni .......... C08G 77/04 |

FOREIGN PATENT DOCUMENTS

| CN | 104804579 A * | 7/2015 | .......... C09D 125/14 |
| DE | 102014108761 A1 | 12/2015 | |
| EP | 2 162 473 B1 | 8/2016 | |
| EP | 2 376 403 B1 | 11/2017 | |
| JP | S63-310781 A | 12/1988 | |
| WO | 2015/197620 A1 | 12/2015 | |
| WO | 2018/058415 A1 | 4/2018 | |

OTHER PUBLICATIONS

CN-104804579-A—English translation (Year: 2015).*
International Search Report and Written Opinion dated Apr. 21, 2021 for PCT/US2021/016720, 13 pages.

* cited by examiner

*Primary Examiner* — Stefanie J Cohen
(74) *Attorney, Agent, or Firm* — Brooks Kushman P.C.

(57) ABSTRACT

An emulsion composition includes an acrylic polymer, a metal silicate, and water. Advantageously, the emulsion composition provides coatings with superior adhesion of coatings to a concrete, clay, or ceramic substrate. In particular, the emulsion composition provides improved adhesion of the silicate primer to the concrete, clay, or ceramic substrate and strong cohesion between the primer and top coat paint allow for a much better overall performance. A method for applying the emulsion composition is also provided.

14 Claims, No Drawings

SILICATE-EMULSION PRIMER AND PAINT

TECHNICAL FIELD

In at least one aspect, the present invention is related to primer and paint compositions that produce primer and paint coatings with improved adhesion to concrete.

BACKGROUND

Most acrylic paint products recommend the need for a primer and one or more topcoats for best performance. However, in many circumstances, adhesive failure is observed when concrete substrates are coated.

Accordingly, there is a need for coating compositions that exhibit improved adhesion to concrete substrates.

SUMMARY

In at least one aspect, an emulsion composition for coating concrete, clay, or ceramic substrates is provided. The emulsion composition includes an acrylic polymer in an amount from about 8 to 25 weight percent; a metal silicate in an amount from about 4 to 10 weight percent; and water. Advantageously, the emulsion composition provides primer or topcoat paint coatings with superior adhesion or coatings to concrete, clay, or ceramic substrates. In particular, the emulsion composition provides improved adhesion of the silicate primer to the concrete, clay, or ceramic substrate and strong cohesion between the primer and topcoat paint allows for a much better overall performance.

In at least one aspect, an emulsion paint composition for coating concrete, clay, or ceramic substrates is provided. The emulsion paint composition includes an acrylic polymer, titanium oxide, a metal silicate having a silica to metal oxide weight ratio from 1.5 to 3.0, and water. Advantageously, the emulsion paint composition provides coatings with superior adhesion of coatings to concrete, clay, or ceramic substrates. In particular, the paint composition provides improved adhesion of the silicate paint to the concrete, clay, or ceramic substrates for a much better overall performance.

In another aspect, a method for coating concrete, clay, or ceramic substrates with the emulsion composition set forth herein is provided. The method includes a step of applying the emulsion composition to the concrete, clay, or ceramic substrates to form an undried coated substrate and then allowing to the undried primer coated substrate to air dry to form a dried coated substrate. In the case of a primer composition, one or more topcoat layers are then applied to the dried primer coated substrates.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R" and R''' are $C_{1-10}$ alkyl or $C_{6-18}$ aryl groups; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R" and R''' are $C_{1-10}$ alkyl or $C_{6-18}$ aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g., pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc. can be practiced with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

In an embodiment, an emulsion composition for coating, a concrete, clay, or ceramic substrates is provided. The emulsion composition includes an acrylic polymer and a metal silicate, and water. In a variation, the acrylic polymer is present in an amount from about 8 to 25 weight percent and the metal silicate is present in an amount from about 4 to 10 weight percent. In a refinement, the metal silicate includes sodium silicate, potassium silicate, lithium silicate, or combinations thereof. Each of the components of the emulsion composition is either dissolved or dispersed in the water. Characteristically, the emulsion composition includes a high concentration of metal (e.g., potassium, sodium, or lithium) silicate for adhesion of the primer to concrete, clay, or ceramic in one variation, the emulsion composition is a composition used to form a primer coating that can be overcoated with one or more topcoats. Therefore, in this context, a prior coating is a coating on a substrate that is meant to be coated with at least one topcoat. In another variation, the emulsion composition is a paint composition that can form paint coatings. In this context, a paint coating is a coating that need not be overcoated with additional topcoats to provide an aesthetically acceptable appearance. When the emulsion composition is a paint composition, the emulsion composition can include a matting agent such as titanium oxide.

In a variation, the metal silicate has a silica to metal oxide weight ratio from 1.5 to 3.0, and water. In this context, the term silica includes silicic acid (i.e., orthosilicic acid) since silica forms silicic acid when dissolved in water and metal oxide includes metal hydroxide since metal oxides form metal hydroxides when dissolved in water. In a refinement, the metal silicate has a silica to metal oxide weight ratio from 2 to 2.8. In a refinement, the metal silicate has a silica to metal oxide weight ratio from about, in increasing order of preference 1.5, 1.8, 2, 2.2, or 2.4 and at most, in increasing order of preference 3, 2.9, 2.8, 2.7, 2.6 or 2.5. In a further refinement, the metal silicate is sodium silicate and the metal oxide is sodium oxide. In another further refinement, the metal silicate is potassium silicate and the metal oxide is potassium oxide.

Although the present invention is not limited to any particular mechanism, it is believed that the driving force for the improved adhesion is the presence of the metal silicate. The silicate will react with the calcium ions in the concrete to form a chemical bond through the process of "silicification." This is an improvement over traditional acrylic primers because those are not based on a chemical bond, but a physical one. The other key feature of this invention is the presence of an acrylic binder in high concentrations. The acrylic binder allows for continuous film formation and gives better cohesion of the later applied topcoat than is observed with silicate alone.

In all of the composition ranges for the emulsion composition components set forth herein, the balance is water. Moreover, all weight percentages set forth herein are weight percentages of the total weight of the emulsion composition.

In a variation, the metal silicate is present in an amount from about 4 to 10 weight percent, in a refinement, the metal silicate is present in an amount from about 6 to 8 weight percent of the total weight of the emulsion composition. In still another refinement, the metal silicate is present in an amount of a least in increasing order of preference 2, 3, 4, 5, 6, or 6.5 weight percent of the total weight of the emulsion composition. In a further refinement, the metal silicate is present in an amount of at most 15, 12, 10, 9, 8, or 7.5 weight percent of the total weight of the emulsion composition.

In a variation, the acrylic polymer is present in an amount from about 8 to 30 weight percent of the total weight of the emulsion composition. In a refinement, the acrylic polymer is present in an amount from about 10 to 25 weight percent of the total weight of the emulsion composition. In still another refinement, the acrylic polymer is present in an amount of at least in increasing order of preference 5, 8, 10, 12, 13, or 14 weight percent of the total weight of the emulsion composition. In a further refinement, the acrylic polymer is present in an amount of at most 30, 25, 20, 18, 16 or 15 weight percent of the total weight of the emulsion composition.

In a variation, the acrylic polymer is an emulsion copolymer. In a refinement, the acrylic polymer is nearly 100% acrylic and is formed from one or more or any combination of monomers selected from the group consisting, of methacrylate, methyl acrylate, ethyl acrylate, 2-chloroethyl vinyl ether, 2-ethylhexyl acrylate, hydroxyethyl methacrylate, butyl acrylate, butyl methacrylate, tri methylolpropane triacrylate, pentafluorophenyl methacrylate, pentafluorophenyl acrylate, 1,1,1,3,3,3-hexafluoroisopropyl acrylate, bis-(2,2, 2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl methacrylate, 1H,1H,3H-hexafluorobutyl methacrylate, 1H, 1H,5H-octafluoropentyl methacrylate, ethylene, propylene, 1-butylene, 2 butylene, vinyl acetate, functional monomers (e.g., phosphorous-containing monomers), acid group monomers, and combinations thereof.

In a variation, titanium oxide is present in an amount from about 8 to 30 weight percent of the total weight of the emulsion composition. In a refinement, the titanium oxide is present in an amount from about 10 to 25 weight percent of the total weight of the emulsion composition. In still another refinement, the titanium oxide is present in an amount of a least in increasing order of preference 5, 8, 10, 12, 13, or 14 weight percent of the total weight of the emulsion composition. In a further refinement, the titanium is present in an amount of at most 30, 25, 20, 18, 16 or 1.5 weight percent of the total weight of the emulsion composition.

In a variation, the emulsion composition further includes a propylene glycol ether (e.g., dipropylene glycol normal butyl ether). In a refinement, the propylene glycol ether is present in an amount from about 0.5 to 2.0 weight percent of the total weight of the emulsion composition. In a further refinement, the propylene glycol ether is present in an amount from about 0.8 to 1.5 weight percent of the total weight of the emulsion composition.

In another variation, the emulsion paint can include a micronized functional filler and/or extender (e.g., median particle size of 3 to 15 microns) produced from nepheline syenite which is a naturally occurring, silica deficient, sodium-potassium alumina silicate. Examples of useful fillers/extenders include, but are not limited to, the Minex® line of fillers commercially available from The Cary Company located in Addison Ill. In a refinement, the micronized functional filler and/or extender is present in an amount from about 0.0 to 30 weight percent of the total weight of the emulsion composition. In a refinement, the micronized functional filler and/or extender is present in an amount from about 10 to 25 weight percent of the total weight of the emulsion composition.

In some variations, the emulsion composition optionally further includes a combination of paint additives selected from the group consisting of matting agents, rheology modifiers, surfactants, defoamers, organic solvents, pH adjusters, UV stabilizers, dispersants (e.g., pigment dispersants), coalescents, biocides, matting agents, opaque polymers, thickeners, mildewcides, and the like, and combinations thereof. It should be appreciated that any combination of these paint additives can be used. In should also be appreciated that each specific additive may refer to a combination of such additives. Typically, the paint additives other than the matting agent are each independently present in an amount from about 0.01 to 10 weight percent. In a refinement, the emulsion composition independently includes 0.1 to 5 weight percent rheology modifiers, 0.01 to 3 weight percent surfactants, 0.01 to 5 weight percent defoamers, 0.01 to 3 weight percent dispersants, 0.1 to 3 weight percent coalescents, 0.01 to 5 weight percent biocides, 0.01 to 3 weight mildewcides, 0.01 to 3 weight pH adjusters, 0.1 to 10 weight percent opaque polymer, 0.2 to 40 matting agents, and combinations thereof. Typically, the additives are present in a combined total amount from about 0.1 to 50 weight percent of the total weight of the emulsion composition.

In a refinement, emulsion composition further includes at least one thickener typically in an amount from about 0.4 to 2.0 weight percent. In a refinement, the at least one thickener is a combination or mixture of thickeners. Useful thickeners can be water-soluble hydroxyethylcellulose surface-treated with glyoxal. Examples of thickeners include, but are not limited to the NATROSOL line of thickeners commercially available from Ashland Global Specialty Chemicals Inc. located in Covington Ky.

In a refinement, the emulsion composition further includes sodium hydroxide typically in an amount from about 0.01 to about 0.15 weight present. In a further refinement, the emulsion composition further includes sodium hydroxide typically in an amount from about 0.02 to about 0.1 weight present.

In a refinement, the emulsion composition thither includes a hydrophobic copolymer pigment dispersant typically in an amount from about 0.1 to 1 weight percent. Examples of suitable dispersants include the TAMOL line of dispersants commercially available from The Dow Chemical Company located in Midland Mich.

In a refinement, the emulsion composition further includes a defoamer typically in an amount from about 0.1 to 1 weight percent. A particularly useful defoamer is a branched polymer in emission-free hydrocarbon matrix. Examples of useful defoamers include, but are not limited to, a defoamer is FOAMASTER® MO 2134, FOAMASTER® MO 2150, FOAMASTER® NO 2335, FOAMSTAR® ED 2521, FOAMSTAR® ED 2522, FOAMSTAR® ED 2523, FOAMSTAR® NO 2306, FOAMSTAR® SI 2210, FOAMSTAR® SI 2213, FOAMSTAR® SI 2216, FOAMSTAR® SI 2250, FOAMSTAR® SI 2280, FOAMSTAR® SI 2293, FOAMSTAR® ST 2438, FOAMSTAR® ST 2454, FOAMSTAR® ST 2420, FOAMSTAR® ST 2420, and FOAMSTAR® ST 2434 commercially available from BASF.

In a refinement, the emulsion composition further includes a surfactant typically in an amount from about 0.1 to 1 weight percent. Suitable surfactants include, but are not limited to, phosphate ester surfactants. Specific examples of surfactants are the DEXTROL® and STRODEX® phosphate ester surfactants commercially available from Ashland Global Specialty Chemicals Inc. located in Covington Ky.

In another embodiment, a method for coating concrete, clay, or ceramic substrates is provided. The method includes a step of applying an emulsion composition set forth above to concrete, clay, or ceramic substrates to form an undried primer coated substrate. The emulsion composition can be applied by any means known to those in the paint industry (e.g., brushing and spraying). The undried primer coated substrate is then allowed to dry in air to form a dried coated substrate. In one variation, the emulsion composition is a primer composition, and the dried coated substrate includes a primer layer over the substrate. In a refinement, one or more topcoat layers are applied to the dried coated substrate. In another variation, the emulsion composition is a topcoat paint composition.

The following examples illustrate the various embodiments of the present invention. Those skilled in the art will recognize many variations that are within the spirit of the present invention and scope of the claims.

Tables 1, 2, and 3 provide exemplary compositions along with a suggested order for mixing the components. Table 1 provides a primer composition while Tables 2 and 3 provide paint composition. The emulsion primer compositions of the present invention are found to produce primer and paint coatings with superior adhesion of an epoxy topcoat coat as compared to commercially available concrete primer compositions. Moreover, the emulsion primer compositions are found to have superior adhesion to concrete substrates, clay tiles, and ceramic tiles. In damp adhesion experiments, the compositions of the present invention are found to produce primer coatings with superior damp adhesion as compared to commercially available concrete primer compositions.

TABLE 1

Emulsion primer composition.

Combine all components with mixing

| | Component | Description | Amount (pounds) | Weight Percent |
|---|---|---|---|---|
| 1. | Water | Water | 283.60 | 30.84% |
| 2. | Avanse 66 | acrylic emulsion (about 51% polymers) | 400 | 43.50% |
| 3. | Foamstar ST 2420 (Foamstar EF 20) | defoamer | 8 | 0.87% |
| 4. | Amonia 26 BE | ammonia | 0.5 | 0.05% |
| 5. | Dextrol ™ OC-180HS | phosphate Ester Surfactant | 4.00 | 0.43% |
| 6. | N Clear Sodium Silicate | 62.5% water, 37.5% silicic acid, sodium salt; sodium silicate | 223.50 | 24.30% |

TABLE 2

Emulsion paint composition.

| | Component | Description | Amount (pounds) | Weight Percent |
|---|---|---|---|---|
| | Combine components 1-7 with mixing | | | |
| 1. | Water | Water | 163.67 | 32.4% |
| 2. | MBR Natrosol 250 | A water-soluble hydroxyethylcellulose surface-treated with glyoxal | 2.5 | 0.49% |
| 3. | GR Natrosol 250 | A water-soluble hydroxyethylcellulose surface-treated with glyoxal | 4 | 0.79% |
| 4. | Foamstar ST 2420 (Foamstar EF 20) | defoamer | 2.0 | 0.40% |
| 5. | 25% sodium hydroxide | 25% sodium hydroxide | 0.5 | 0.1% (0.025% NaOH) |
| 6. | Tamol-165A/FX-665 | Hydrophobic Copolymer Pigment Dispersant | 2.0 | 0.40% |
| 7. | OC-180HS | Phosphate ester surfactant | 2.0 | 0.40% |
| | Mix on high for 10 minutes | | | |
| 8. | Kronos 4311 Slurry | Titanium oxide slurry (76.5% solids) | 100.00 | 19.8 (15.1% TiO$_2$) |
| | Add component 8 and mix for 15 minutes them proceed to letdown | | | |
| 9. | Rhoplex SG-10AF | Acrylic polymer | 100.00 | 19.8% (about 9.9% solids) |
| 10. | Drew L475 | A non-ionic foam control agent | 2.00 | 0.40% |
| | Add components 9 and 10 and mix for 10 minutes | | | |
| 11. | Kasil 1 | potassium silicate, 29.1% solution in water | 123.0 | 24.3% (about 7.1% potassium silicate) |

TABLE 2-continued

Emulsion paint composition.

| | Component | Description | Amount (pounds) | Weight Percent |
|---|---|---|---|---|
| | Add component 11 and mix for 10 minutes | | | |
| 12. | Glycol Ether DPnB | Propylene Glycol Ether | 4.0 | 0.79% |
| | Add component 12 and mix for 30 minutes | | | |

TABLE 3

Emulsion paint composition.

| | Component | Description | Amount (pounds) | Weight Percent |
|---|---|---|---|---|
| | Combine components 1-7 with mixing | | | |
| 1. | Water | Water | 69.33 | 13.6% |
| 2. | MBR Natrosol 250 | A water-soluble hydroxyethylcellulose surface-treated with glyoxal | 1.0 | 0.2% |
| 3. | GR Natrosol 250 | A water-soluble hydroxyethylcellulose surface-treated with glyoxal | 2.0 | 0.39% |
| 4. | Foamstar ST 2420 (Foamstar EF 20) | defoamer | 2.0 | 0.39% |
| 5. | 25% sodium hydroxide | 25% sodium hydroxide | 0.5 | 0.10% (0.025% NaOH) |
| 6. | Tamol-165A/FX-665 | Hydrophobic Copolymer Pigment Dispersant | 2.0 | 0.39% |
| 7. | OC-180HS | Phosphate ester surfactant | 2.0 | 0.39% |
| | Mix on high for 10 minutes | | | |
| 8. | Kronos 4311 Slurry | Titanium oxide slurry (76.5% solids) | 100.00 | 19.6% (15% TiO$_2$) |
| | Add components 9 and 10 and mix for 15 minutes them proceed to letdown | | | |
| 9. | Rhoplex SG-10AF | Acrylic polymer | 200.00 | 39.2% (about 19.6% solids) |
| 10. | Drew L475 | A non-ionic foam control agent | 2.00 | 0.39% |
| | Add components 9 and 10 and mix for 10 minutes | | | |
| 11. | Kasil 1 | potassium silicate, 29.1% solution in water | 123.01 | 24.1% (7.01% potassium silicate) |
| | Add component 11 and mix for 10 minutes | | | |
| 12. | Glycol Ether DPnB | Propylene Glycol Ether | 6.0 | 1.18% |
| | Add component 12 and mix for 30 minutes | | | |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An emulsion composition comprising:
   an acrylic polymer in an amount from 8 to 30 weight percent;
   a metal silicate in an amount from 4 to 10 weight percent;
   a propylene glycol ether is present in an amount from 0.5 to 2.0 weight percent and water.

2. The emulsion composition of claim 1, wherein the metal silicate includes potassium silicate, sodium silicate, lithium silicate, or combinations thereof.

3. The emulsion composition of claim 1, wherein the metal silicate has a silica to metal oxide weight ratio from 1.5 to 3.0.

4. The emulsion composition of claim 1, wherein the emulsion composition is a primer composition.

5. The emulsion composition of claim 1, wherein the emulsion composition is a topcoat paint composition.

6. The emulsion composition of claim 5 further comprising titanium oxide.

7. The emulsion composition of claim 6, wherein the titanium oxide in an amount of 10 to 25 weight percent.

8. The emulsion composition of claim 1, wherein the propylene glycol ether is dipropylene glycol normal butyl ether.

9. The emulsion composition of claim 1 further comprising at least one thickener.

10. The emulsion composition of claim 9, wherein the at least one thickener is a water-soluble hydroxyethylcellulose surface-treated with glyoxal.

11. The emulsion composition of claim 9, wherein the at least one thickener is present in an amount from 0.4 to 2.0 weight percent.

12. The emulsion composition of claim 9 further comprising a hydrophobic copolymer pigment dispersant in an amount from 0.1 to 1 weight percent.

13. The emulsion composition of claim 1 further comprising a defoamer in an amount from 0.1 to 1 weight percent.

14. The emulsion composition of claim 1 further comprising a surfactant in an amount from 0.1 to 1 weight percent.

* * * * *